(12) United States Patent
Liu et al.

(10) Patent No.: US 12,689,308 B2
(45) Date of Patent: Jul. 21, 2026

(54) VOLTAGE CONVERSION CIRCUIT, CONTROL METHOD, POWER SUPPLY DEVICE, AND STORAGE MEDIUM

(71) Applicant: ZTE CORPORATION, Shenzhen (CN)

(72) Inventors: Rundong Liu, Shenzhen (CN); Hong Wang, Shenzhen (CN); Jianping Zhou, Shenzhen (CN); Jingxuan Zhou, Shenzhen (CN); Zhexu Li, Shenzhen (CN); Lingsong Yi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 295 days.

(21) Appl. No.: 18/579,955

(22) PCT Filed: Jul. 8, 2022

(86) PCT No.: PCT/CN2022/104725
§ 371 (c)(1),
(2) Date: Jan. 17, 2024

(87) PCT Pub. No.: WO2023/005645
PCT Pub. Date: Feb. 2, 2023

(65) Prior Publication Data
US 2024/0356455 A1 Oct. 24, 2024

(30) Foreign Application Priority Data

Jul. 26, 2021 (CN) .......................... 202110842593.6

(51) Int. Cl.
*H02M 7/217* (2006.01)
*H02M 3/158* (2006.01)

(52) U.S. Cl.
CPC ........... *H02M 7/217* (2013.01); *H02M 3/158* (2013.01)

(58) Field of Classification Search
CPC .............................. H02M 3/158; H02M 7/217
(Continued)

(56) References Cited

U.S. PATENT DOCUMENTS 9,866,113 B1 * 1/2018 Assaad ................. H02M 3/158
2014/0266135 A1 9/2014 Zhak et al.
(Continued)

FOREIGN PATENT DOCUMENTS

CN 1389971 A 1/2003
CN 110190732 A 8/2019
(Continued)

OTHER PUBLICATIONS

International Searching Authority. International Search Report and Written Opinion for PCT Application No. PCT/CN2022/104725 and English translation, mailed Sep. 14, 2022, pp. 1-11.
(Continued)

*Primary Examiner* — Yemane Mehari
(74) *Attorney, Agent, or Firm* — Vivacqua Crane, PLLC

(57) ABSTRACT

A voltage conversion circuit, a control method, a power supply device, and a storage medium are provided. The circuit may include a fourth switch module, a third switch module, a first switch module, a second switch module and a ground lead which are sequentially connected in series; a first capacitor connected to a first common terminal and a second common terminal respectively; a second capacitor connected to a power output terminal and a ground lead; a driving module configured to regulate an initial duty ratio of a driving signal for each of the first to fourth switch modules, based on a capacitor voltage of both ends of the first capacitor; and an inductor connected with a power input terminal and a third common terminal respectively, or connected with the third common terminal and the power output terminal respectively.

16 Claims, 8 Drawing Sheets

Reference number 105: Driving module

(58) Field of Classification Search
USPC ......................................................... 363/127
See application file for complete search history.

(56) References Cited

U.S. PATENT DOCUMENTS

| | | | | |
|---|---|---|---|---|
| 2017/0237339 | A1* | 8/2017 | Young | H02M 1/38 |
| | | | | 363/126 |
| 2017/0338735 | A1* | 11/2017 | Alarcon-Cot | H02M 3/07 |
| 2019/0190373 | A1 | 6/2019 | Nussbaum | |
| 2020/0412239 | A1* | 12/2020 | Grbovic | H02M 3/07 |
| 2021/0111643 | A1* | 4/2021 | Hsin | H02M 7/487 |
| 2021/0152100 | A1 | 5/2021 | Zilio | |

FOREIGN PATENT DOCUMENTS

| | | | |
|---|---|---|---|
| CN | 210867509 | U | 6/2020 |
| CN | 111371323 | A | 7/2020 |
| CN | 112152464 | A | 12/2020 |
| CN | 112737335 | A | 4/2021 |
| JP | 2012075204 | A | 4/2012 |
| WO | 2019029250 | A1 | 2/2019 |
| WO | 2020024171 | A1 | 2/2020 |

OTHER PUBLICATIONS

The State Intellectual Property Office of People's Republic of China. First Office Action for CN Application No. 2021108425936 and English translation, mailed Aug. 9, 2023, pp. 1-8.
The State Intellectual Property Office of People's Republic of China. Search Report for CN Application No. 2021108425936 and English translation, mailed Sep. 26, 2023, pp. 1-4.
The State Intellectual Property Office of People's Republic of China. Second Office Action for CN Application No. 2021108425936 and English translation, mailed Sep. 28, 2023, pp. 1-4.
European Patent Office. Extended European Search Report for EP Application No. 22848250.1, mailed Sep. 30, 2024, pp. 1-10.
Vu, T., et al. "99% Efficiency 3-Level Bridgeless Totem-pole PFC Implementation with Low-voltage Silicon at Low Cost," 2019 IEEE Applied Power Electronics Conference and Exposition (APEC), 2019, pp. 2077-2083.
Vu, T., et al. "Feasibility Study of Compact High-efficiency Bidirectional 3-Level Bridgeless Totem-pole PFC/Inverter at Low Cost," 2020 IEEE Applied Power Electronics Conference and Exposition (APEC), 2020, pp. 3397-3404.

* cited by examiner

Reference number 105: Driving module

Reference number 105: Driving module

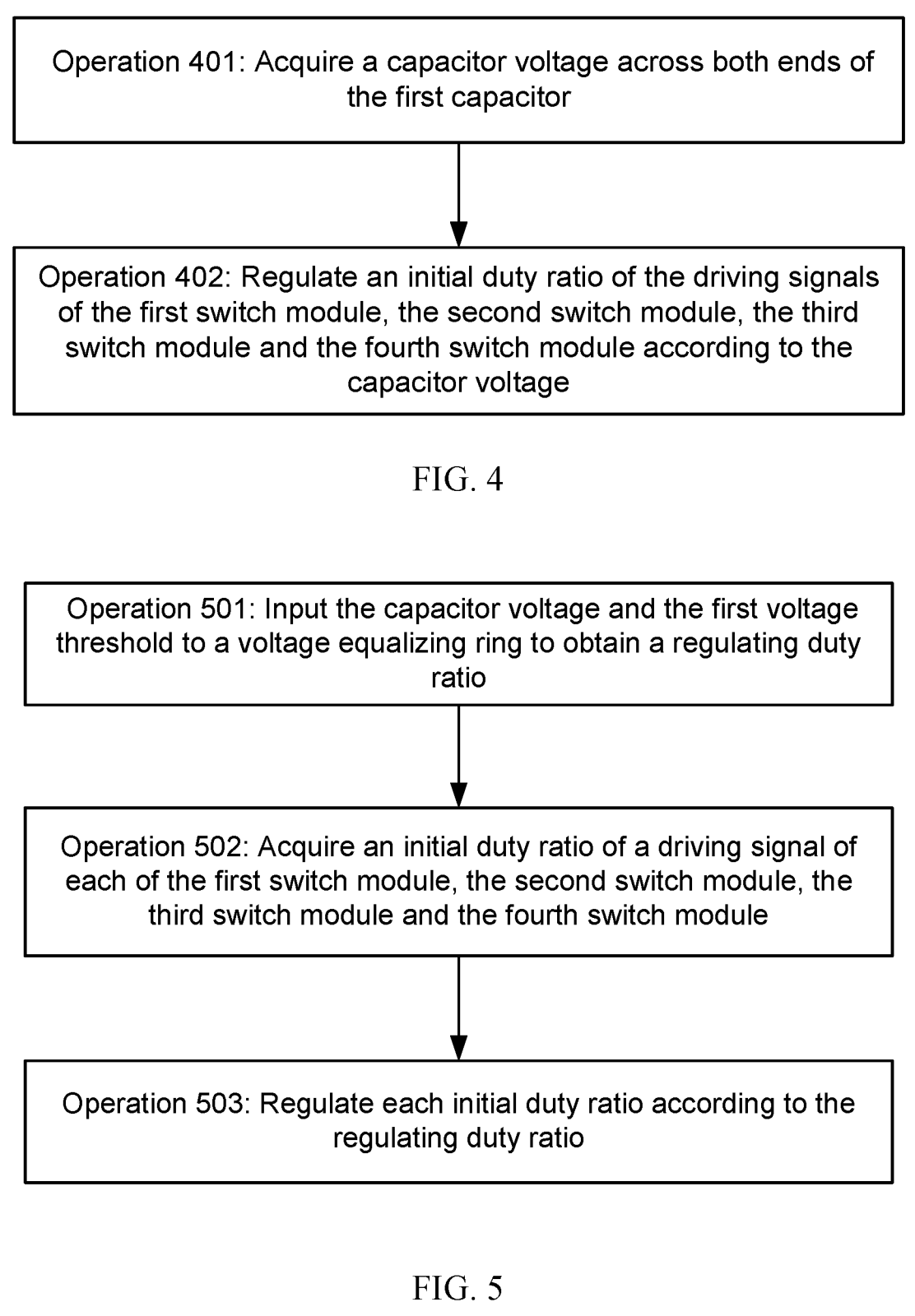

Operation 401: Acquire a capacitor voltage across both ends of the first capacitor Operation 402: Regulate an initial duty ratio of the driving signals of the first switch module, the second switch module, the third switch module and the fourth switch module according to the capacitor voltage

FIG. 4

Operation 501: Input the capacitor voltage and the first voltage threshold to a voltage equalizing ring to obtain a regulating duty ratio Operation 502: Acquire an initial duty ratio of a driving signal of each of the first switch module, the second switch module, the third switch module and the fourth switch module Operation 503: Regulate each initial duty ratio according to the regulating duty ratio

FIG. 5

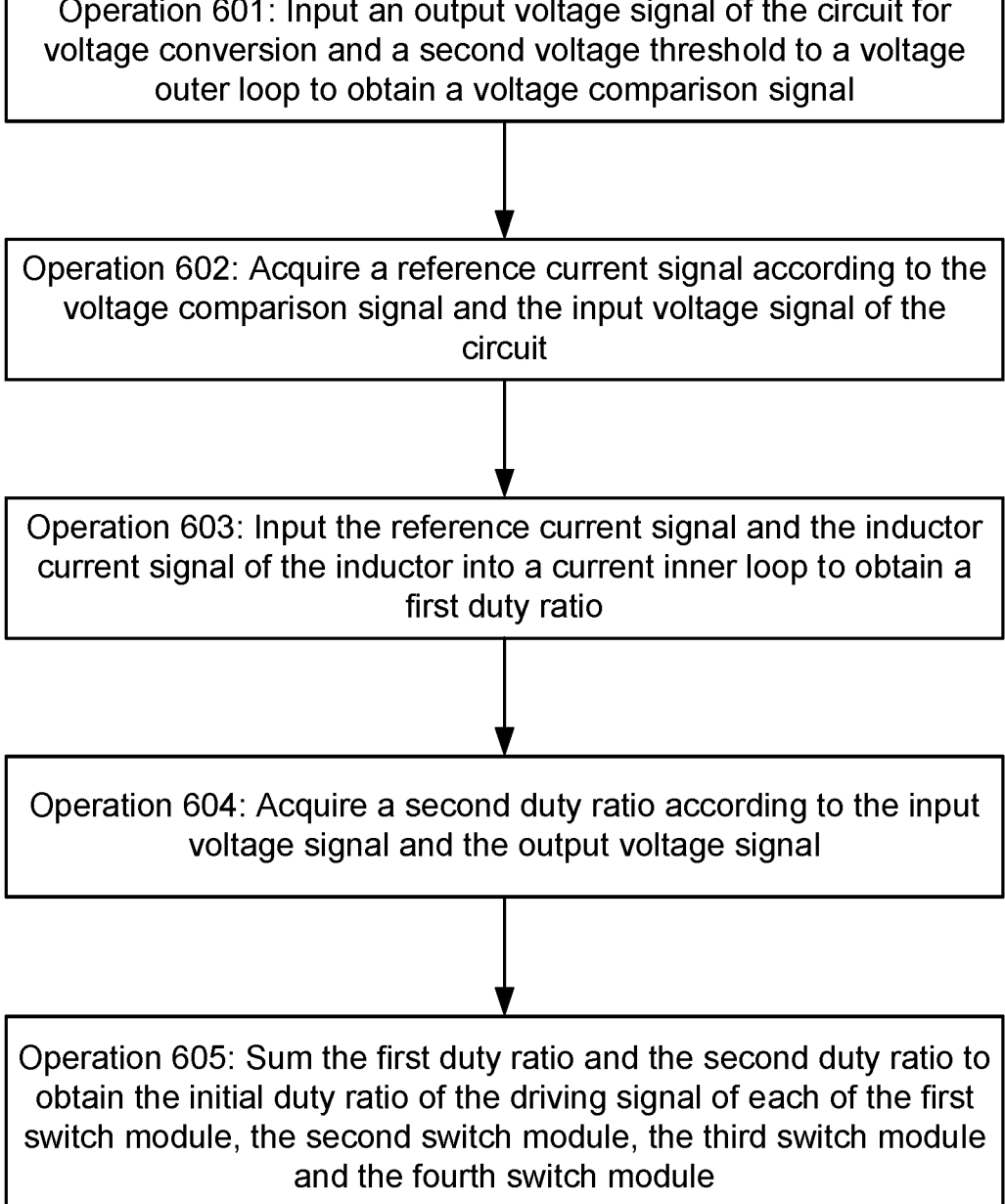

Operation 601: Input an output voltage signal of the circuit for voltage conversion and a second voltage threshold to a voltage outer loop to obtain a voltage comparison signal Operation 602: Acquire a reference current signal according to the voltage comparison signal and the input voltage signal of the circuit Operation 603: Input the reference current signal and the inductor current signal of the inductor into a current inner loop to obtain a first duty ratio Operation 604: Acquire a second duty ratio according to the input voltage signal and the output voltage signal Operation 605: Sum the first duty ratio and the second duty ratio to obtain the initial duty ratio of the driving signal of each of the first switch module, the second switch module, the third switch module and the fourth switch module

FIG. 6

VOLM: VOLTAGE OUTER LOOP MODULE
CRSGM: CURRENT REFERENCE SIGNAL GENERATION MODULE
CILM: CURRENT INNER LOOP MODULE
FC: FEEDFORWARD CONTROL
VERM: VOLTAGE EQUALIZING RING MODULE

VOLTAGE CONVERSION CIRCUIT, CONTROL METHOD, POWER SUPPLY DEVICE, AND STORAGE MEDIUM

CROSS-REFERENCE TO RELATED APPLICATION

This application is a national stage filing under 35 U.S.C. § 371 of international application number PCT/CN2022/104725, filed Jul. 8, 2022, which claims priority to Chinese patent application No. 202110842593.6 filed Jul. 26, 2021. The contents of these applications are incorporated herein by reference in their entireties.

TECHNICAL FIELD

The present disclosure relates to the technical field of power supply, in particular to a circuit for voltage conversion, a method for controlling, a power supply device, and a storage medium.

BACKGROUND

Circuit for voltage conversion is an indispensable part of a power supply device. Conventional circuits for voltage conversion include a boost chopper circuit (BOOST circuit) or a buck chopper circuit (BUCK circuit). Traditional circuits for voltage conversion generally control power through multiple switching tubes. However, due to the differences in the electrical properties of the switching tubes, the synchronization of each switching tube will be reduced during the operation of the circuits, which will reduce the stability of the circuits.

SUMMARY

The following is a summary of the subject matter described herein. This summary is not intended to limit the scope of protection of the claims.

Provided are a circuit for voltage conversion, a method for controlling, a power supply device, and a storage medium.

An embodiment of the present disclosure provides a circuit for voltage conversion, which may include, a first switch module, a second switch module, a third switch module and a fourth switch module, where the fourth switch module, the third switch module, the first switch module, the second switch module and a ground lead are sequentially connected in series; a first capacitor connected to a first common terminal and a second common terminal respectively, where the first common terminal is the common terminal of the first switch module and the second switch module, and the second common terminal is the common terminal of the third switch module and the fourth switch module; a second capacitor connected to a power output end and the ground lead; a driving module, configured to regulate an initial duty ratio of a driving signal for each of the first switch module, the second switch module, the third switch module and the fourth switch module based on a capacitor voltage of both ends of the first capacitor, where the driving module is respectively connected with the first switch module, the second switch module, the third switch module and the fourth switch module; and an inductor connected with a power input terminal and the third common terminal respectively, or connected with the third common terminal and the power output terminal respectively; where the third common terminal is a common terminal of the first switch module and the third switch module.

An embodiment of the present disclosure provides a method for controlling the circuit for voltage conversion as described above, the method may include, acquiring a capacitor voltage across both ends of the second capacitor; and regulating an initial duty ratio of a driving signal for each of the first switch module, the second switch module, the third switch module and the fourth switch module based on the capacitor voltage.

An embodiment of the present disclosure provides a power supply device, which may include the circuit for voltage conversion as described above; or the device may include a memory and a processor, where the memory stores a computer program which, when executed by the processor, causes the processor to carry out the method as described above.

An embodiment of the present disclosure provides a computer-readable medium storing a computer program thereon which, when executed by a processor, causes the processor to carry out any one the method as described above.

Other features and advantages of the present disclosure will be illustrated in the following description, and in part will be apparent from the description, or may be understood by practicing the present disclosure. The objects and other advantages of the present disclosure can be achieved and obtained by the structure particularly set forth in the description, claims and drawings.

BRIEF DESCRIPTION OF DRAWINGS

The drawings are intended to provide a further understanding of the technical scheme of the present disclosure, and constitute a part of the specification, and they are intended to illustrate the technical scheme of the present disclosure in conjunction with the embodiments of the present disclosure, but are not intended to limit the technical scheme of the present disclosure.

FIG. 4 depicts a flowchart showing a method for controlling a circuit for voltage conversion according to an embodiment of the present disclosure;

FIG. 5 depicts a flow chart showing a procedure where an initial duty ratio of the driving signal for each of the first switch module, the second switch module, the third switch module and the fourth switch module is regulated according to the capacitor voltage, according to an embodiment of the present disclosure;

FIG. 6 depicts a flow chart showing a procedure where an initial duty ratio of a driving signal for each of the first switch module, the second switch module, the third switch module and the fourth switch module is acquired, according to an embodiment of the present disclosure;

DETAILED DESCRIPTION

The purpose, technical scheme and advantages of the present disclosure will become apparent through the following description for various embodiments in conjunction with the drawings. It should be understood that the embodiments described here are intended for illustration but not limitation of the present disclosure.

It should be understood that in the description of embodiments of the present disclosure, a plurality (or plurality) means more than two; greater than, less than, more than, etc. shall be understood to exclude the number being referred to; and above, below, within, etc. shall be understood to include the number being referred to. Term "first" and "second" if described, are intended for distinguishing technical features, which shall not be understood as indicating or implying relative importance or implicitly indicating the number of the indicated technical features or the order of the indicated technical features.

In some cases, a voltage conversion circuit may include a plurality of flying capacitors. In order to enable the flying capacitors to operate properly, the capacitor voltage across both ends of each flying capacitor are kept at a certain voltage. Due to the difference in electrical performance of the switching tubes, the synchronization of the actions of each switching tube will be reduced during the operation of the voltage conversion circuit. As such, it is not possible for the capacitor voltage across both ends of a flying capacitor to remain stable, thus reducing the stability of the voltage conversion circuit.

In view of this, some embodiments of the present disclosure provide a circuit for voltage conversion exhibiting high operating stability, a method for controlling, a power supply device, and a storage medium.

Figure 1:
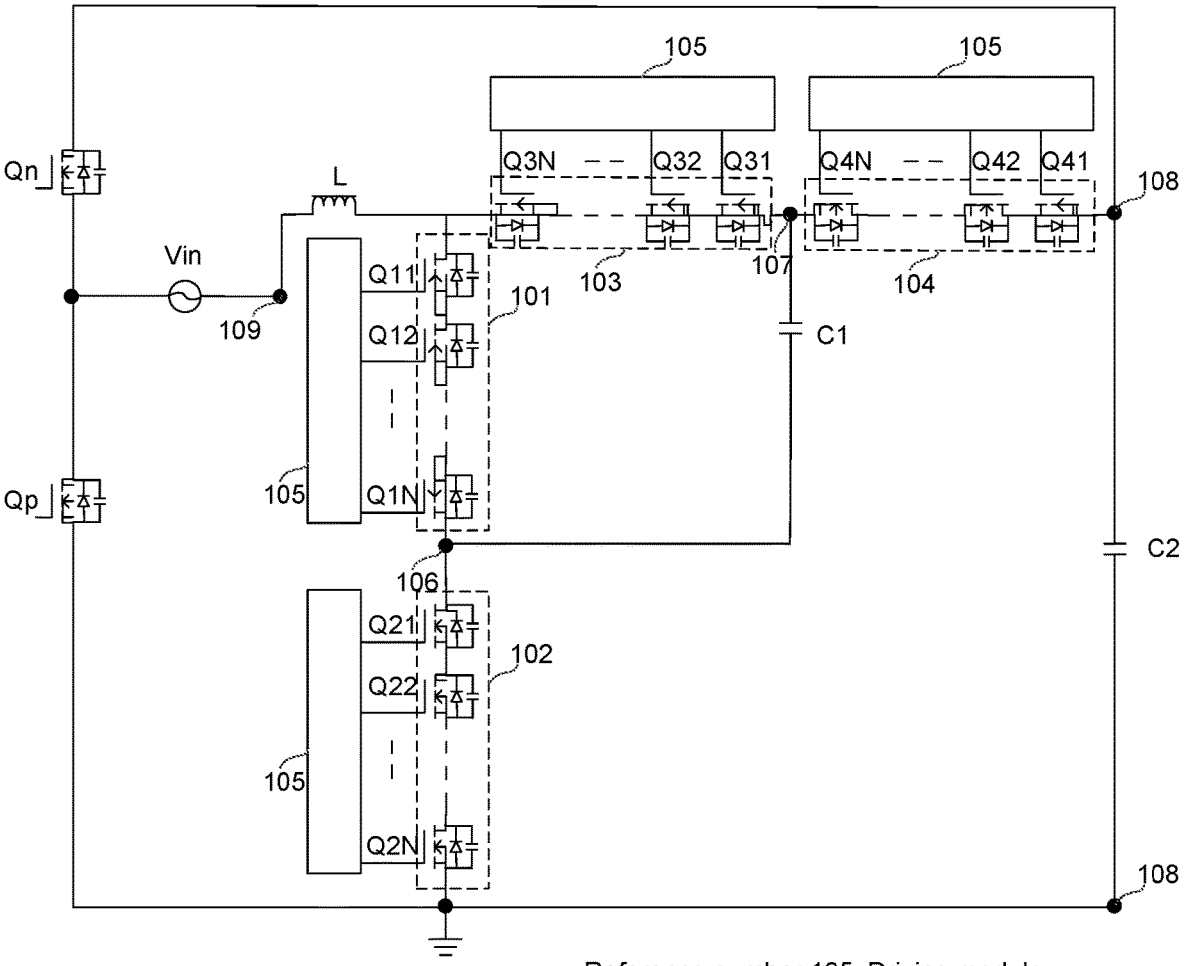
FIG. 1 depicts a schematic circuit diagram showing a circuit for voltage conversion according to an embodiment of the present disclosure.

FIG. 1 depicts a schematic circuit diagram of a circuit for voltage conversion according to an embodiment of the present disclosure. The circuit includes a first switch module 101, a second switch module 102, a third switch module 103, a fourth switch module 104, a first capacitor C1, a second capacitor C2, a driving module 105 and an inductor L. The fourth switch module 104, the third switch module 103, the first switch module 101, the second switch module 102 and a ground lead are connected in series in a sequence in which they are mentioned. The first capacitor C1 is connected to a first common terminal 106 and a second common terminal 107 respectively. The first common terminal 106 is the common terminal of the first switch module 101 and the second switch module 102. The second common terminal 107 is the common terminal of the third switch module 103 and the fourth switch module 104. The second capacitor C2 is respectively connected with a power output terminal and the ground lead. The driving module 105 is configured to regulate an initial duty ratio of the driving signal for each of the first switch module 101, the second switch module 102, the third switch module 103 and the fourth switch module 104 according to the capacitor voltage across both ends of the first capacitor C1. The driving module 105 is respectively connected with the first switch module 101, the second switch module 102, the third switch module 103 and the fourth switch module 104. The inductor L is respectively connected with the power input terminal 109 and the third common terminal that is the common terminal of the first switch module 101 and the third switch module 103.

The inductor L is respectively connected with the power input terminal 109 and the third common terminal, so that the circuit for voltage conversion shown in FIG. 1 constitutes a BOOST circuit. In addition, the circuit for voltage conversion shown in FIG. 1 can also include a reflux switching tube Qn and a reflux switching tube Qp, both of which are configured to form a current loop in a positive half cycle and a negative half cycle of the input alternating current signal. The first capacitor C1 is arranged between the first common terminal 106 and the second common terminal 107 such that the first capacitor C1 is a flying capacitor. Furthermore, the driving module 105 is provided, and which is configured to regulate an initial duty ratio of the driving signal for each of first switch module 101, the second switch module 102, the third switch module 103 and the fourth switch module 104 according to the capacitor voltage across both ends of the first capacitor C1. As such, the balance and stability of the capacitor voltage across the two ends of the first capacitor C1 can be improved during the operation of the circuit for voltage conversion, and the stability of the circuit for voltage conversion can be further improved. In addition, only one first capacitor C1 is provided, which is beneficial to reducing the control difficulty of the circuit for voltage conversion and reducing the footprint of the circuit for voltage conversion.

In an implementation, each of the first switch module 101, the second switch module 102, the third switch module 103 and the fourth switch module 104 includes a plurality of first switching devices connected in series. The first switching devices each can be a switching tube, such as a Metal-Oxide-Semiconductor Field-Effect Transistor (MOS transistor), and each MOS transistor further includes a corresponding body diode and a parasitic capacitor. Referring to FIG. 1, that is, the first switch module 101 includes switching tubes Q11 to Q1N, the second switch module 102 includes switching tubes Q21 to Q2N, the third switch module 103 includes switching tubes Q31 to Q3N, and the fourth switch module 104 includes switching tubes Q41 to Q4N. Through the arrangement in which the plurality of first switching devices are connected in series with each other, low-voltage switching tubes can be employed to adapt to higher input voltage, and the control efficiency of the switching tubes can be improved.

In an implementation, the first switch module 101 and the second switch module 102 have identical number of the first switching devices. The third switch module 103 and the fourth switch module 104 have identical number of the first switching devices. The above arrangement is equivalent to the case where an end of the first capacitor C1 is connected to the midpoint between Q11 and Q2N, and the other end of the first capacitor C1 is connected to the midpoint between Q31 and Q4N. As such, the synchronization of control of the first switch module 101 and the second switch module 102 can be improved, and the stability of the circuit for voltage conversion during operation can be improved.

Figure 2:
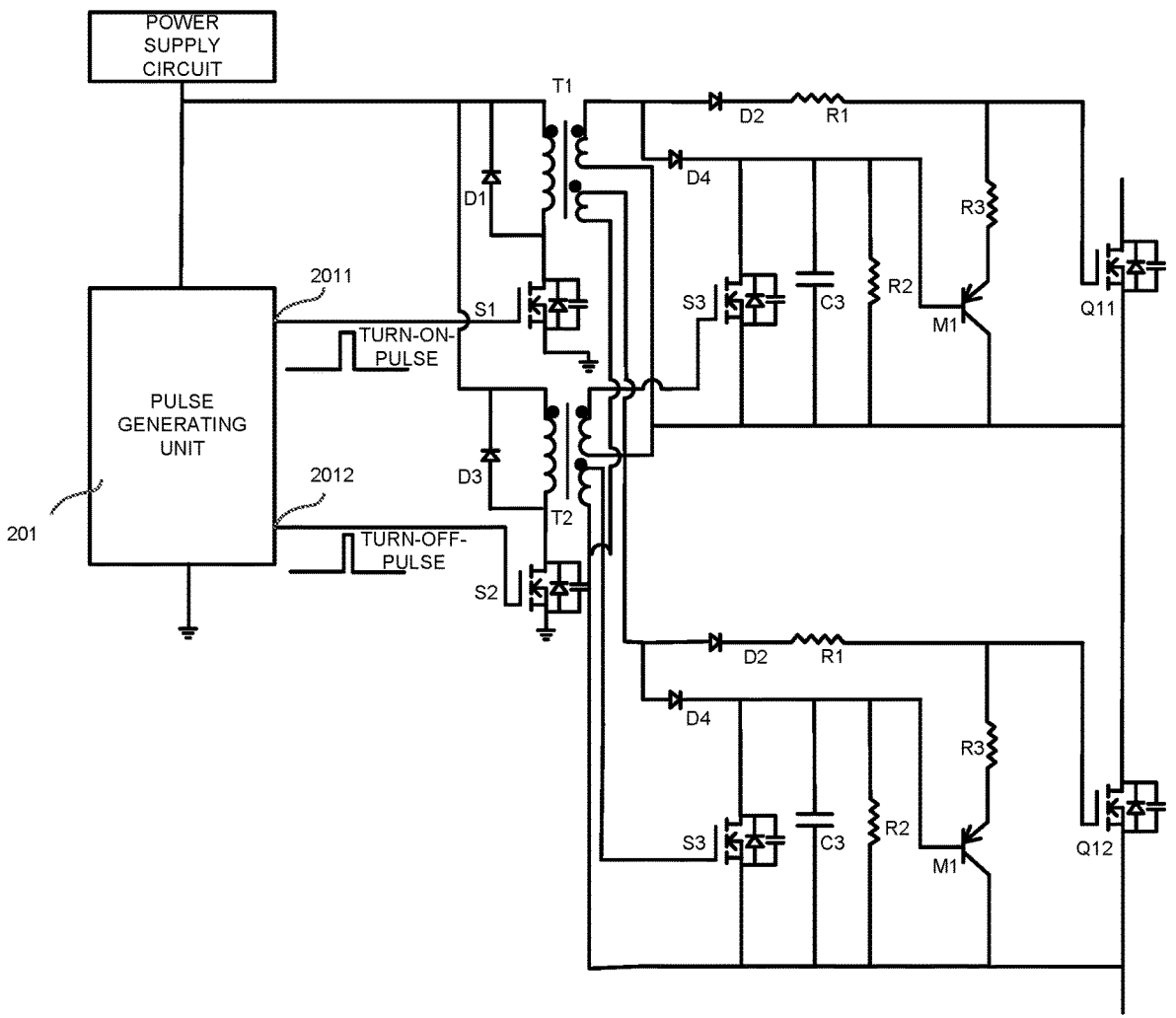
FIG. 2 depicts a schematic circuit diagram showing the driving module according to an embodiment of the present disclosure.

FIG. 2 depicts a schematic circuit diagram showing a driving module 105 according to an embodiment of the present disclosure. The driving module 105 includes a pulse generating unit 201, a first transformer T1, a second switching device S1, a second transformer T2, and a fifth switching device. The pulse generating unit 201 includes a turn-on-pulse output terminal 2011 and a turn-off-pulse output terminal 2012. The first transformer T1 includes a first primary winding and a plurality of first secondary windings, and both ends of the first primary winding are connected in parallel with a first diode D1. The anode of the first diode D1 is connected with the non-dotted end of the first primary winding, the non-dotted end of each first secondary winding is connected with the gate electrode of the first switching device through the second diode D2 and the first resistor R1 in turn. The dotted end of each first secondary winding is correspondingly connected with the source electrode of the first switching device. The gate electrode of the second switching device S1 is connected with the turn-on-pulse output terminal 2011. The drain electrode of the second switching device S1 is connected with the anode of the first diode D1, and the source electrode of the second switching device S1 is connected with the ground lead. The second transformer T2 includes a second primary winding and a plurality of second secondary windings. Both ends of the second primary winding are connected in parallel with a third diode D3. The anode of the third diode D3 is connected with the non-dotted end of the second primary winding. The dotted end of each second secondary winding is correspondingly connected with the first switching device through a third switching device S3 and a fourth switching device M1. The dotted end of each second secondary winding is connected with the gate electrode of the third switching device S3. The drain electrode of the third switching device S3 is connected with the base electrode of the fourth switching device M1. The source electrode of the third switching device S3 is connected with the source electrode of the first switching device. The emitting electrode of the fourth switching device M1 is connected with the gate electrode of the first switching device. The collecting electrode of the fourth switching device M1 is connected with the source electrode of the first switching device. The gate electrode of the fifth switching device is connected with the turn-off-pulse output terminal 2012. The drain electrode of the fifth switching device is connected with the anode of the third diode D3. The source electrode of the fifth switching device is connected with the ground lead.

The first transformer T1 is configured to induce the turn-on pulse, and the second transformer T2 is configured to induce the turn-off pulse. The number of the first secondary winding and the number of the second secondary winding can be determined according to the number of the first switching devices. For example, if ten (10) first switching devices are provided, ten (10) first secondary winding and ten (10) the second secondary winding are provided with each connected to each of the first switching devices correspondingly, so as to control the turn-on or turn-off of the plurality of first switching devices. It can be understood that the controlling of the switch on and off the first switching devices is illustrated in FIG. 2 which shows only two first switching devices by way of an example.

The pulse generating unit 201 generates a turn-on pulse and outputs the pulse to the second switching device S1 through the turn-on pulse output terminal, so that the second switching device S1 is turned on. The first secondary winding induces a pulse corresponding to the turn-on pulse and exerts the pulse to the gate electrode of the first switching device through the first diode D1 and the first resistor R1, so that a plurality of first switching devices are turned on concurrently. The first diode D1 and the first resistor R1 can prevent the current from flowing back, and improve the stability of the circuit for voltage conversion.

The pulse generating unit 201 generates a turn-off pulse and outputs the pulse to the fifth switching device through the turn-off-pulse output terminal 2012, so that the fifth switching device is turned on. The second secondary winding induces a pulse corresponding to the turn-off pulse and exerts the pulse to the gate electrode of the third switching device S3, so that the third switching device S3 is turned on, and in turn the fourth switching device M1 is turned on, thus providing a discharge loop for the parasitic capacitance of the first switching device, so that a plurality of first switching devices are turned off concurrently.

In an implementation, referring to FIG. 2, the driving module 105 further includes a second resistor R2 and a third capacitor C3 both respectively connected with the base electrode and the collecting electrode of the fourth switching device M1. Through the second resistor R2 and the third capacitor C3, even if the fourth switching device M1 fails to be turned on, a discharge loop can be provided for the parasitic capacitance of the first switching device, thus improving the stability of the first switching device being turn off.

Figure 3:
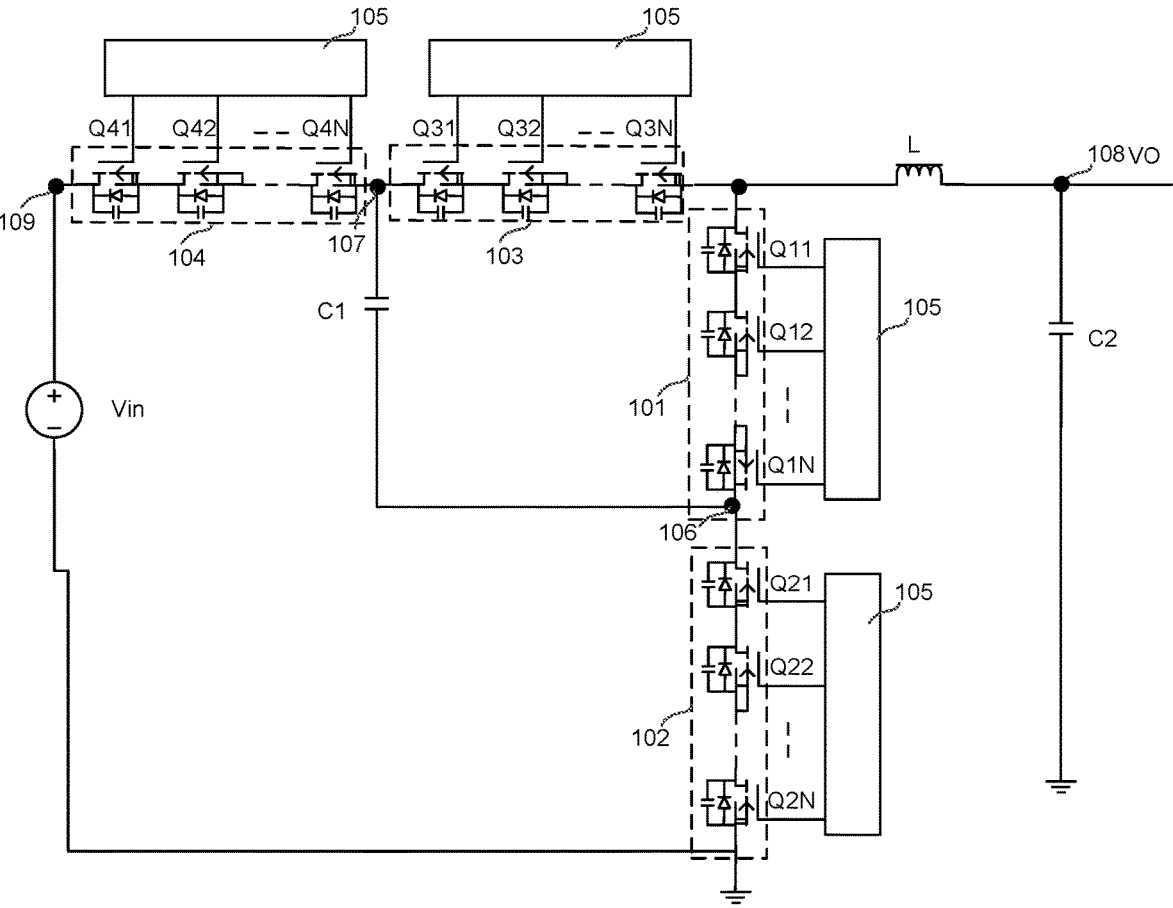
FIG. 3 depicts a schematic circuit diagram showing another circuit for voltage conversion according to an embodiment of the present disclosure.

FIG. 3 depicts a circuit schematic diagram showing another circuit for voltage conversion according to an embodiment of the present disclosure. The difference from the circuit shown in FIG. 1 lies in that the inductor L in FIG. 3 is connected to the third common terminal and the power output terminal respectively, so that the circuit for voltage conversion shown in FIG. 1 constitutes a BUCK circuit, where the structures of the first switch module 101, the second switch module 102, the third switch module 103, the fourth switch module 104 and the driving module 105 in the circuit for voltage conversion shown in FIG. 3 are similar to those shown in FIG. 1, and will not be described here.

The operating principle of the circuit for voltage conversion shown in FIG. 1 will be illustrated in connection with a method embodiment. Based on the circuit for voltage conversion shown in FIG. 1, FIG. 4 depicts a flowchart showing a method for controlling a circuit for voltage conversion according to an embodiment of the present disclosure. The method includes but is not limited to the following operations 401 to 402.

At operation 401, a capacitor voltage across both ends of the first capacitor are acquired.

At operation 402, an initial duty ratio of the driving signal for each of the first switch module, the second switch module, the third switch module and the fourth switch module is regulated according to the capacitor voltage.

In the above operations 401 to 402, an initial duty ratio of the driving signal for each of the first switch module, the second switch module, the third switch module and the fourth switch module is regulated according to the capacitor voltage of both ends of the first capacitor, such that the balance and stability of the capacitor voltage across the two ends of the first capacitor can be improved during the operation of the circuit for voltage conversion, thereby improving the stability of the circuit for voltage conversion.

FIG. 5 depicts a further flow chart showing the regulation of the initial duty ratio of the driving signal for each of the first switch module, the second switch module, the third switch module and the fourth switch module according to the capacitor voltage according to an embodiment of the present disclosure. The above operation 402 may include the following operations 501 to 503.

At operation 501, the capacitor voltage and the first voltage threshold are input to a voltage equalizing ring to obtain a regulating duty ratio.

At operation 502, an initial duty ratio of a driving signal for each of the first switch module, the second switch module, the third switch module and the fourth switch module is acquired.

At operation 503, the initial duty ratio is regulated according to the regulating duty ratio.

The first voltage threshold is compared with the capacitor voltage of the first capacitor by the voltage equalizing ring introduced at operation 501. The initial duty ratio of the driving signal for each of the first switch module, the second switch module, the third switch module and the fourth switch module is regulated by an output regulating duty ratio, which has the advantages of simple control and high efficiency.

It can be understood that the first voltage threshold can be set according to the practical situation, and which is not limited in the present disclosure.

FIG. 6 depicts a further flow chart showing the acquisition of the initial duty ratio of the driving signal for each of the first switch module, the second switch module, the third switch module and the fourth switch module according to an embodiment of the present disclosure. The above operation 502 may include the following operations 601 to 605.

At operation 601, an output voltage signal of the circuit for voltage conversion and a second voltage threshold are input to a voltage outer loop to obtain a voltage comparison signal.

At operation 602, a reference current signal is obtained according to the voltage comparison signal and the input voltage signal of the circuit for voltage conversion.

At operation 603, the reference current signal and the inductor current signal of the inductor are input into a current inner loop to obtain a first duty ratio.

At operation 604, a second duty ratio is acquired according to the input voltage signal and the output voltage signal.

At operation 605, the first duty ratio and the second duty ratio are summed to obtain the initial duty ratio of the driving signal for each of the first switch module, the second switch module, the third switch module and the fourth switch module.

Figure 7:
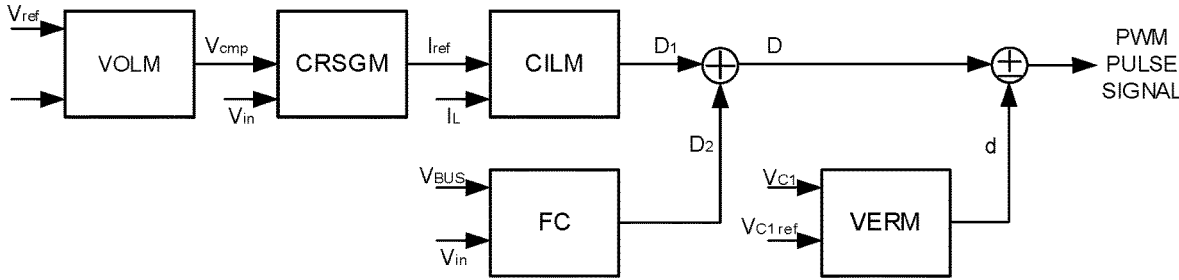
FIG. 7 depicts a schematic diagram showing the calculation and regulation of the initial duty ratio according to an embodiment of the present disclosure.

FIG. 7 depicts a schematic diagram showing calculation and regulation of the initial duty ratio according to an embodiment of the present disclosure. FIG. 7 shows a voltage outer loop module (VOLM), a current reference signal generation module (CRSGM), a current inner loop module (CILM), a feedforward control (FC), and a voltage equalizing ring module (VERM). In FIG. 7, $V_{ref}$ denotes the second voltage threshold, $V_{BUS}$ denotes the output voltage signal of the circuit for voltage conversion, $V_{in}$ denotes the input voltage signal of the circuit for voltage conversion, $V_{cmp}$ denotes the voltage comparison signal, $I_{ref}$ denotes the reference current signal, $I_L$ denotes the inductor current signal, $V_{C1\ ref}$ denotes the first voltage threshold, $V_{C1}$ denotes the capacitor voltage, $D_1$ denotes the first duty ratio, $D_2$ denotes the second duty ratio, D denotes the initial duty ratio, and d denotes the regulating duty ratio.

$D_2$ can be obtained by the following equation, $$D_2 = \left(1 - \frac{V_{BUS}}{V_{in}}\right) * k;$$

After the second duty ratio is obtained, the initial duty ratio can be calculated by $D=D_1+D_2$.

It can be understood that the second voltage threshold can be set according to the practical situation, and which is not limited in the present disclosure.

In an implementation based on the circuit for voltage conversion shown in FIG. 1, the input voltage signal is an AC signal, and in the positive half cycle of the input voltage signal, the initial duty ratio of the first switch module or the second switch module is regulated according to the regulating duty ratio. In the negative half cycle of the input voltage signal, the initial duty ratio of the third switch module or the fourth switch module is regulated according to the regulating duty ratio.

Figure 8:
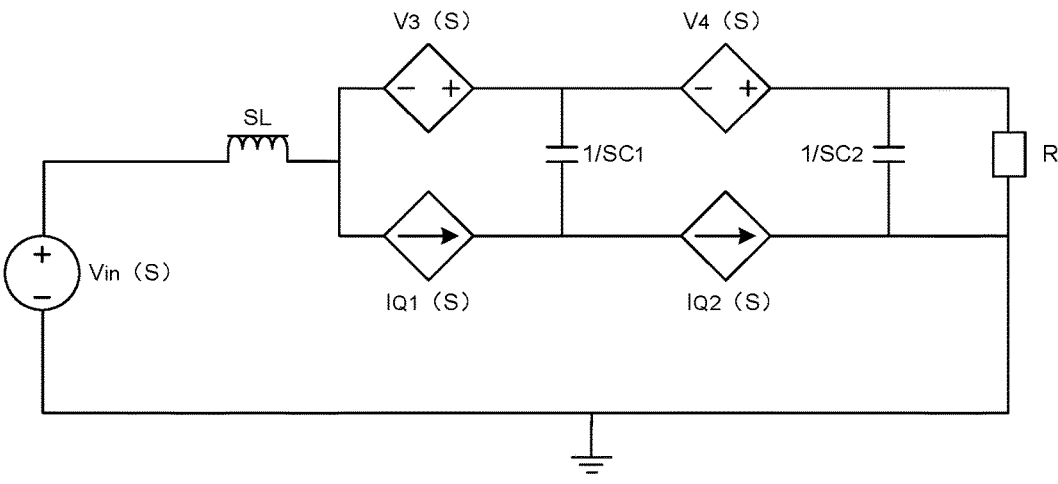
FIG. 8 depicts a schematic diagram showing a small-signal model according to an embodiment of the present disclosure.

Taking the positive half cycle of AC signal as an example, the circuit for voltage conversion is analyzed by means of a small-signal model. FIG. 8 depicts a schematic diagram showing the small-signal model according to an embodiment of the present disclosure, where $V_3$ denotes the voltage of the body diode of the third switch module, $V_4$ denotes the voltage of the body diode of the fourth switch module, $I_{Q1}$ denotes the current of the first switch module, and $I_{Q2}$ is the current of the second switch module. Through KVL and KCL theorems, it can be concluded that:

$$G_{V_o d_1} = \frac{\tilde{V}_0}{\tilde{d}_1} \Big|_{\tilde{V}_{in}, \tilde{d}_2 = 0} = \frac{\frac{V_{in}}{2}\left(1 - \frac{sL}{R(1-D)}\right)}{s^2 L C_{BUS} + sL/R + (1-D)^2}$$

$$G_{V_o d_2} = \frac{\tilde{V}_0}{\tilde{d}_2} \Big|_{\tilde{V}_{in}, \tilde{d}_1 = 0} = \frac{\frac{V_{in}}{2}\left(1 - \frac{sL}{R(1-D)}\right)}{s^2 L C_{BUS} + sL/R + (1-D)^2} = G_{V_o d_1}$$

$$G_{V_{C1} d_1} = \frac{\tilde{V}_{C1}}{\tilde{d}_1} \Big|_{\tilde{V}_{in}, \tilde{d}_2 = 0} = -\frac{V_o}{sC_1 R(1-D)}$$

$$G_{V_{C1} d_2} = \frac{\tilde{V}_{C1}}{\tilde{d}_2} \Big|_{\tilde{V}_{in}, \tilde{d}_1 = 0} = \frac{V_o}{sC_1 R(1-D)} = -G_{V_{C1} d_1}$$

In particular, G denotes a ratio, s denotes the S-domain, $\tilde{V}_{in}$ denotes the input voltage variation in the circuit for voltage conversion, $\tilde{V}_0$ denotes the output voltage variation in the circuit for voltage conversion, D denotes the initial duty ratio, $\tilde{d}_1$ denotes the duty ratio variation in driving signal for the first switch module, $\tilde{d}_2$ denotes the duty ratio variation in driving signal for the second switch module, L denotes the inductance of the inductor, $C_1$ denotes the capacitance of the first capacitor, $C_{BUS}$ denotes the capacitance of the second capacitor, R denotes the resistance of the resistor in the small-signal model. Through small-signal analysis, it can be known that when the duration during which the first switch module is turned on increases and the duration during which the second switch module is turned on decreases, the voltage of the first capacitor will rise and the output voltage of the circuit for voltage conversion will remain unchanged. On the contrary, when the duration during which the first switch module is turned on decreases and the duration during which the second switch module is turned on increases, the voltage of the first capacitor will drop and the output voltage of the circuit for voltage conversion will remain unchanged.

Based on this, in the positive half cycle of the input voltage signal, when the capacitor voltage is less than or equal to the first voltage threshold, the difference between the initial duty ratio and the regulating duty ratio is taken as the first target duty ratio of the first switch module, and the sum of the initial duty ratio and the regulating duty ratio is taken as the second target duty ratio of the second switch module. That is, when the capacitor voltage is less than or equal to the first voltage threshold, the first target duty ratio of the first switch module is D-d, and the second target duty ratio of the second switch module is D+d, so that the capacitor voltage rises and the capacitor voltage remains stable.

When the capacitor voltage is greater than the first voltage threshold, the sum of the initial duty ratio and the regulating duty ratio is taken as the first target duty ratio of the first switch module, and the difference between the initial duty ratio and the regulating duty ratio is taken as the second target duty ratio of the second switch module. That is, when the capacitor voltage is less than or equal to the first voltage threshold, the first target duty ratio of the first switch module is D+d, and the second target duty ratio of the second switch module is D-d, so that the capacitor voltage falls and the capacitor voltage remains stable.

In the positive half cycle of the input voltage signal, the phase difference between the first target duty ratio and the second target duty ratio can be 180 degrees, thus improving the stability of control. In addition, the duty ratio of the third switch module is complementary to the first target duty ratio, and the duty ratio of the fourth switch module is complementary to the second target duty ratio, so the duty ratios of the third switch module and the fourth switch module are not specifically described here.

Figure 9:
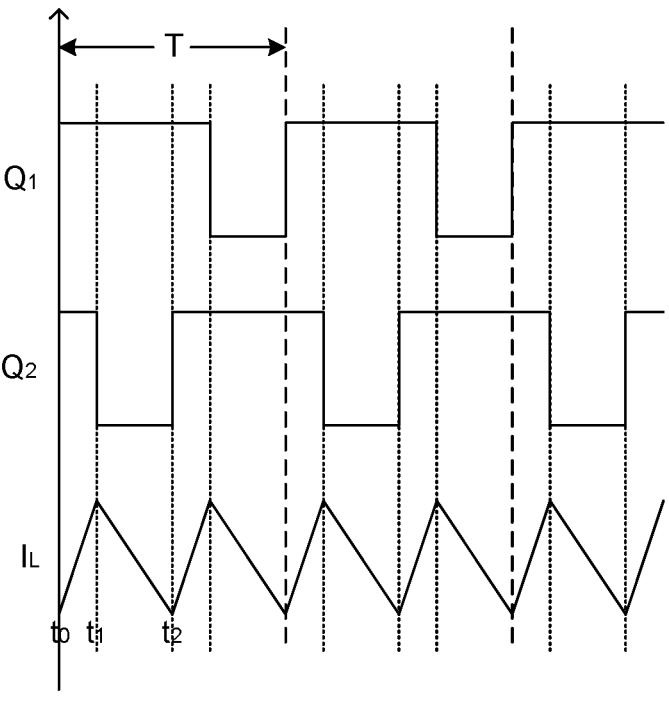
FIG. 9 depicts a schematic diagram showing a relationship between the duty ratio of the first switch module and the second switch module and the inductor current according to an embodiment of the present disclosure.
Figure 10:
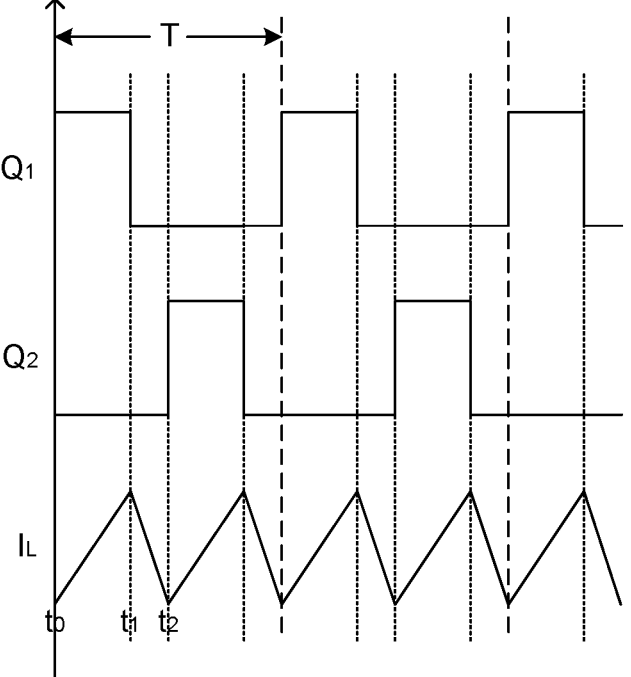
FIG. 10 depicts a schematic diagram showing another relationship between the duty ratio of the first switch module and the second switch module and the inductor current according to an embodiment of the present disclosure.

FIG. 9 depicts a schematic diagram showing a relationship between the duty ratio of the first switch module and the second switch module and the inductor current according to an embodiment of the present disclosure, in which when $V_{in}$ is less than $$\frac{1}{2} V_{BUS},$$

the duty ratios of the first switch module and the second switch module are greater than $$\frac{1}{2},$$

thereby prolonging the time for discharging the inductor. FIG. 10 depicts a schematic diagram showing another relationship between the duty ratio of the first switch module and the second switch module and the inductor current according to an embodiment of the present disclosure, in which when $V_{in}$ is greater than $$\frac{1}{2} V_{BUS},$$

the duty ratios of the first switch module and the second switch module are smaller than $$\frac{1}{2},$$

thereby shortening the time for discharging the inductor. It can be understood that the duty ratios of the first switch module and the second switch module may also be different.

In the negative half cycle of the input voltage signal, when the capacitor voltage is less than or equal to the first voltage threshold, the difference between the initial duty ratio and the regulating duty ratio is taken as the third target duty ratio of the third switch module, and the sum of the initial duty ratio and the regulating duty ratio is taken as the fourth target duty ratio of the fourth switch module. That is, when the capacitor voltage is less than or equal to the first voltage threshold, the third target duty ratio of the third switch module is D-d, and the fourth target duty ratio of the fourth switch module is D+d, so that the capacitor voltage rises and the capacitor voltage remains stable.

When the capacitor voltage is greater than the first voltage threshold, the sum of the initial duty ratio and the regulating duty ratio is taken as the third target duty ratio of the third switch module, and the difference between the initial duty ratio and the regulating duty ratio is taken as the fourth target duty ratio of the fourth switch module. That is, when the capacitor voltage is greater than the first voltage threshold, the third target duty ratio of the third switch module is D+d, and the fourth target duty ratio of the fourth switch module is D-d, so that the capacitor voltage falls and the capacitor voltage remains stable.

In the negative half cycle of the input voltage signal, the phase difference between the third target duty ratio and the fourth target duty ratio can be 180 degrees, thus improving the stability of control. In addition, the duty ratio of the first switch module is complementary to the third target duty ratio, and the duty ratio of the second switch module is complementary to the fourth target duty ratio, so the duty ratios of the first switch module and the second switch module are not specifically described here.

Similarly, during the negative half-cycle of the input voltage signal, the relationship between the duty ratio of the first switch module and the second switch module and the inductor current is similar to that in the positive half-cycle of the input voltage signal, which is not repeated here.

In addition, based on the circuit for voltage conversion shown in FIG. 3, the input voltage signal of the circuit for voltage conversion is a DC signal, which is also applicable to the method steps shown in FIG. 4, FIG. 5 and FIG. 6. The difference is that the initial duty ratio is regulated according to the regulating duty ratio, in particular, the initial duty ratio of the third switch module or the fourth switch module is regulated according to the regulating duty ratio, but the initial duty ratio of the first switch module and the second switch module is not regulated.

Based on the schematic diagram showing the calculation and regulation of the initial duty ratio shown in FIG. 3, the difference between the circuit for voltage conversion shown in FIG. 3 and the circuit for voltage conversion shown in FIG. 1 is that $D_2$ in the circuit for voltage conversion shown in FIG. 3 can be obtained by the following equation:

$$D_2 = \frac{V_{BUS}}{V_{in}} * k$$

Figure 11:
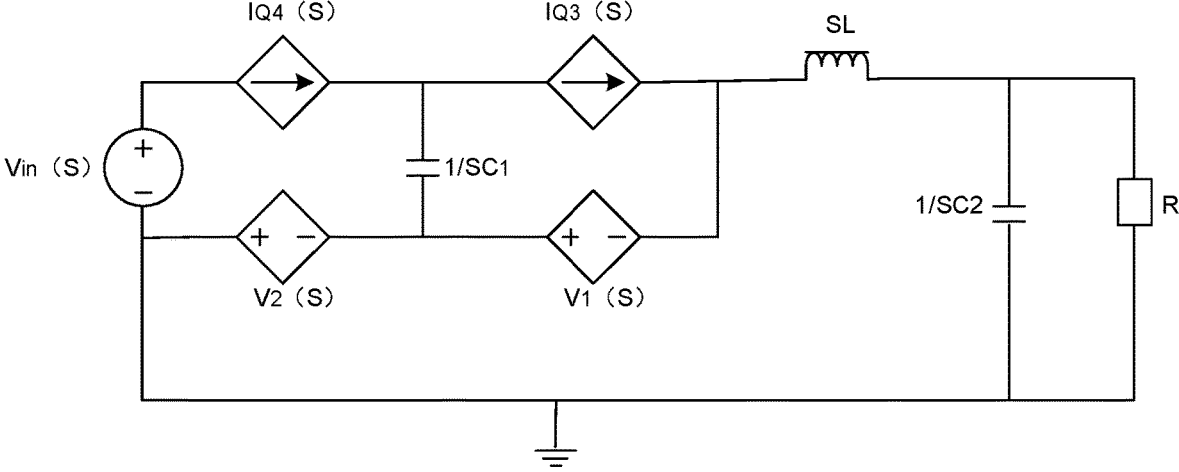
FIG. 11 depicts a schematic diagram showing another small-signal model according to an embodiment of the present disclosure.

FIG. 11 depicts a schematic diagram showing another small-signal model according to an embodiment of the present disclosure, in which $V_1$ denotes the voltage of the body diode of the first switch module, $V_2$ denotes the voltage of the body diode of the second switch module, $I_{Q3}$ denotes the current of the third switch module, and $I_{Q4}$ denotes the current of the fourth switch module. The circuit for voltage conversion shown in FIG. 3 can be analyzed by means of the small-signal model shown in FIG. 11, and similar conclusions can be obtained. Therefore, regulating the initial duty ratio of the third or fourth switch module based on the regulating duty ratio can be, in response to a determination that the capacitor voltage is less than or equal to the first voltage threshold, taking a difference between the initial duty ratio and the regulating duty ratio as a third target duty ratio of the third switch module, and taking a sum of the initial duty ratio and the regulating duty ratio as a fourth target duty ratio of the fourth switch module. That is, when the capacitor voltage is less than or equal to the first voltage threshold, the third target duty ratio of the third switch module is D-d, and the fourth target duty ratio of the fourth switch module is D+d, so that the capacitor voltage rises and the capacitor voltage remains stable;

in response to a determination that the capacitor voltage is greater than the first voltage threshold, taking a sum of the initial duty ratio and the regulating duty ratio as a third target duty ratio of the third switch module, and taking a difference between the initial duty ratio and the regulating duty ratio as a fourth target duty ratio of the fourth switch module. That is, when the capacitor voltage is greater than the first voltage threshold, the third target duty ratio of the third switch module is D+d, and the fourth target duty ratio of the fourth switch module is D-d, so that the capacitor voltage rises and the capacitor voltage remains stable.

It can be understood that although the operations in the above flowcharts are displayed in sequence as indicated by arrows, these operations are not necessarily executed in sequence as indicated by the arrows. Unless explicitly stated in this embodiment, the order of execution of these operations is not strictly limited, and these operations can be executed in another order. Moreover, at least some operations in the above flowchart may include multiple operations or multiple stages, these operations or stages may not necessarily be completed concurrently, but may be executed at different moments, and the execution order of these operations or stages may not necessarily be sequentially executed, but may be alternately or alternatively executed with other operations or at least a part of operations or stages in other operations.

Figure 12:
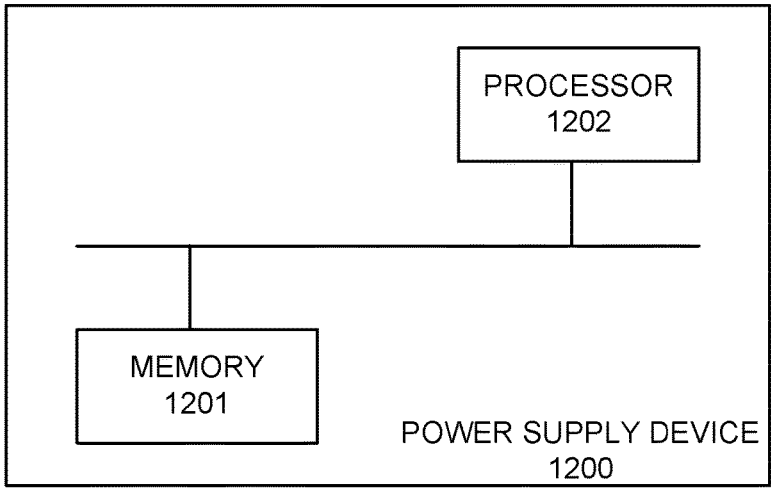
FIG. 12 depicts a schematic diagram of a power supply device according to an embodiment of the present disclosure.

FIG. 12 depicts a power supply device 1200 according to an embodiment of the present disclosure. The power supply device 1200 includes a memory 1201, a processor 1202, and a computer program stored in the memory 1201 and executable by the processor 1202, and the computer program when is executed by the processor, causes the processor to carry out the method for controlling the circuit for voltage conversion as described in any one of the embodiments above.

The processor 1202 and the memory 1201 may be connected by a bus or other means.

The memory 1201, as a non-transient computer-readable storage medium, can be configured to store non-transitory software programs and non-transitory computer-executable programs, such as the method for controlling the circuit for voltage conversion as described in any one of the embodiments above in the present disclosure. The processor 1202 executes the non-transitory software programs and instructions stored in the memory 1201, such that the method as described above is carried out.

The memory 1201 may include a program storage section and a data storage section, in which the program storage section may store an operating system and application programs for performing at least one operation, and data storage section may store program of the method described in any one of the embodiments of the present disclosure. In addition, the memory 1201 may include high-speed random-access memory 1201 and non-transitory memory 1201, such as at least one memory device, flash memory device, or other non-transitory solid-state memory devices. In some embodiments, the memory 1201 may include the memory 1201 remotely arranged with respect to the processor 1202, and the remote memory 1201 may be connected to the power supply device 1200 through a network. Examples of the above networks include, but are not limited to, the Internet, intranet, local area network, mobile communication network, and combinations thereof.

The non-transitory software programs and instructions for carrying out the above method for controlling the circuit for voltage conversion are stored in the memory 1201, which when executed by one or more processors 1202, causes the processor to carry out the above method for controlling the circuit for voltage conversion, for example, to carry out the operations 401 to 402 described in conjunction with FIG. 4, operations 501 to 503 described in conjunction with FIG. 5, or operations 601 to 605 described in conjunction with FIG. 6.

An embodiment of the present disclosure provides a computer-readable storage medium storing a computer-executable instruction which when executed by a processor causes the processor to carry out any one of the methods as described above.

In an embodiment, the computer-readable storage medium stores computer-executable instructions, which when executed by one or more control processors, causes the processor(s) to carry out for example, the operations 401 to 402 described in conjunction with FIG. 4, operations 501 to 503 described in conjunction with FIG. 5, or operations 601 to 605 described in conjunction with FIG. 6.

According to various embodiments of the present disclosure, a first capacitor is arranged between a first common terminal and a second common terminal, such that the first capacitor operates as a flying capacitor. A driving module is arranged, which is configured to regulate the initial duty ratio of a driving signal for each of the first switch module, the second switch module, the third switch module and the fourth switch module according to the capacitor voltage across both ends of the first capacitor. Thereby, the advantages can be achieved that, the balance and stability of the capacitor voltage across both ends of the first capacitor can be improved during the operation of the circuit for voltage conversion, and the stability of the circuit can be further improved. In addition, only one first capacitor is needed, which is beneficial to reducing the control difficulty of the circuit while reducing the footprint of the circuit.

The above-described device embodiments are only illustrative, in which the units illustrated as separate components may or may not be physically separated, that is, they may be located in one place or distributed over several network units. Some or all of the modules can be selected according to the practical needs to achieve the purpose of this embodiment.

It shall be appreciated by a person having ordinary skills in the art that all or some of the steps and systems disclosed above can be implemented as software, firmware, hardware and their appropriate combinations. Some or all physical components can be implemented as software executed by a processor, such as a central processing unit, a digital signal processor or a microprocessor, or as hardware, or as an integrated circuit, such as an application specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-re-movable medium implemented in any method or technology for storing information such as computer readable instructions, data structures, program modules or other data. Computer storage medium includes, but is not limited to, RAM, ROM, EEPROM, flash memory or other memory technologies, CD-ROM, digital versatile disks (DVD) or other optical disk storage, magnetic boxes, tapes, storage device or other magnetic storage devices, or any other medium that can be configured to store desired information and accessible by a computer. Furthermore, it is well known to ta person having ordinary skills in the art that communication media usually contains computer-readable instructions, data structures, program modules or other data in modulated data signals such as carrier waves or other transmission mechanisms, and can include any information delivery media.

It should also be understood that various implementations set forth in some embodiments of the present disclosure can be combined to achieve different technical effects without limitations.

Described above is a description for several embodiments of the present disclosure, but the present disclosure is not limited to the above embodiments. Those having ordinary skills in the art can various equivalent modifications or substitutions without departing the scope of the present disclosure, and these equivalent modifications or substitutions are within the scope defined by the claims of the present disclosure.

What is claimed is:

1. A circuit for voltage conversion, comprising,
a first switch module;
a second switch module;
a third switch module;
a fourth switch module; wherein the fourth switch module, the third switch module, the first switch module, the second switch module and a ground lead are sequentially connected in series;
a first capacitor connected to a first common terminal and a second common terminal respectively, wherein the first common terminal is a common terminal of the first switch module and the second switch module, and the second common terminal is the common terminal of the third switch module and the fourth switch module;
a second capacitor connected to a power output terminal and the ground lead;
a driving module configured to regulate an initial duty ratio of a driving signal for each of the first switch module, the second switch module, the third switch module and the fourth switch module based on a capacitor voltage of both ends of the first capacitor, wherein the driving module is respectively connected with the first switch module, the second switch module, the third switch module and the fourth switch module; and
an inductor connected with a power input terminal and a third common terminal respectively, or connected with the third common terminal and the power output terminal respectively; wherein the third common terminal is a common terminal of the first switch module and the third switch module.

2. The circuit as claimed in claim 1, wherein,
the first switch module, the second switch module, the third switch module and the fourth switch module each comprises a plurality of first switch devices connected in series.

3. The circuit as claimed in claim 2, wherein,
the first switch module comprises an identical number of the first switching devices to the number of the first switching devices of the second switch module, and the third switch module comprises an identical number of the first switching devices to the number of the first switching devices of the fourth switch module.

4. The circuit as claimed in claim 2, wherein the driving module comprises,
a pulse generating unit that comprises a turn-on-pulse output terminal and a turn-off-pulse output terminal;
a first transformer that comprises a first primary winding and a plurality of first secondary windings, with both ends of the first primary winding connected in parallel with a first diode;
wherein an anode of the first diode is connected with a non-dotted end of the first primary winding, a non-dotted end of each first secondary winding is correspondingly connected with a gate electrode of the first switching device through a second diode and a first resistor in sequence; and
a dotted end of each first secondary winding is correspondingly connected with a source electrode of the first switching device;
a second switching device that comprises, a gate electrode connected with the turn-on-pulse output terminal, a drain electrode connected with the anode of the first diode, and a source electrode connected with the ground lead;
a second transformer that comprises a second primary winding and a plurality of second secondary windings, with both ends of the second primary winding connected in parallel with a third diode;
wherein an anode of the third diode is connected with a non-dotted end of the second primary winding; a dotted end of each second secondary winding is correspondingly connected with the first switching device through a third switching device and a fourth switching device;
the dotted end of each second secondary winding is connected with a gate electrode of the third switching device; a drain electrode of the third switching device is connected with a base electrode of the fourth switching device;
a source electrode of the third switching device is connected with the source electrode of the first switching device; a emitting electrode of the fourth switching device is connected with the gate electrode of the first switching device; and a collecting electrode of the fourth switching device is connected with the source electrode of the first switching device; and
a fifth switching device that comprises, a gate electrode connected with the turn-off-pulse output terminal, a drain electrode connected with the anode of the third diode, and a source electrode connected with the ground lead.

5. The circuit as claimed in claim 4, wherein the driving module further comprises a second resistor and a third capacitor each connects with the base electrode and a collecting electrode of the fourth switching device respectively.

6. A method for controlling a circuit for voltage conversion, which is applied to the circuit as claimed in claim 1, the method comprising, acquiring the capacitor voltage across both ends of the first capacitor; and regulating an initial duty ratio of a respective driving signal for each of the first switch module, the second switch module, the third switch module and the fourth switch module based on the capacitor voltage.

7. The method as claimed in claim 6, wherein regulating the initial duty ratio of the respective driving signal for each of the first switch module, the second switch module, the third switch module and the fourth switch module based on the capacitor voltage, comprises, inputting the capacitor voltage and a first voltage threshold to a voltage equalizing ring to obtain a regulating duty ratio;

acquiring the initial duty ratio of the respective driving signal for each of the first switch module, the second switch module, the third switch module and the fourth switch module; and regulating the initial duty ratio based on the regulating duty ratio.

8. The method as claimed in claim 7, wherein acquiring the initial duty ratio of the respective driving signal for each of the first switch module, the second switch module, the third switch module and the fourth switch module, comprises, inputting an output voltage signal of the circuit for voltage conversion and a second voltage threshold to a voltage outer loop to acquire a voltage comparison signal;

acquiring a reference current signal based on both the voltage comparison signal and an input voltage signal of the circuit for voltage conversion;

inputting the reference current signal and an inductor current signal of the inductor into a current inner loop to acquire a first duty ratio;

acquiring a second duty ratio based on the input voltage signal and the output voltage signal; and summing the first duty ratio and the second duty ratio to acquire the initial duty ratio of the respective driving signal for each of the first switch module, the second switch module, the third switch module and the fourth switch module.

9. The method as claimed in claim 7, wherein the regulating the initial duty ratio according to the regulating duty ratio comprises, in response to the inductor being connected with a power supply input terminal and a third common terminal respectively, supplying an alternating current (AC) signal as an input voltage signal to the circuit for voltage conversion, regulating the initial duty ratio of the first switch module or the second switch module according to the regulating duty ratio during a positive half cycle of the input voltage signal; and regulating the initial duty ratio of the third switch module or the fourth switch module according to the regulating duty ratio during a negative half cycle of the input voltage signal; or, in response to the inductor being connected with the third common terminal and a power supply output terminal respectively, supplying a direct current (DC) signal as the input voltage signal to the circuit for voltage conversion, and regulating the initial duty ratio of each of the third switch module or the fourth switch module according to the regulating duty ratio.

10. The method as claimed in claim 9, wherein in response to the inductor being connected with the power supply input terminal and the third common terminal respectively, regulating the initial duty ratio of the first switch module or the second switch module according to the regulating duty ratio, comprises at least one of, in response to a determination that the capacitor voltage is less than or equal to the first voltage threshold, taking a difference between the initial duty ratio and the regulating duty ratio as a first target duty ratio of the first switch module, and taking a sum of the initial duty ratio and the regulating duty ratio as a second target duty ratio of the second switch module; or in response to a determination that the capacitor voltage is greater than the first voltage threshold, taking the sum of the initial duty ratio and the regulating duty ratio as the first target duty ratio of the first switch module, and taking the difference between the initial duty ratio and the regulating duty ratio as the second target duty ratio of the second switch module.

11. The method as claimed in claim 9, wherein in response to the inductor being connected with the power supply input terminal and the third common terminal respectively, regulating the initial duty ratio of each of the third switch module or the fourth switch module according to the regulating duty ratio, comprises at least one of, in response to a determination that the capacitor voltage is less than or equal to the first voltage threshold, taking a difference between the initial duty ratio and the regulating duty ratio as a third target duty ratio of the third switch module, and taking a sum of the initial duty ratio and the regulating duty ratio as a fourth target duty ratio of the fourth switch module; or in response to a determination that the capacitor voltage is greater than the first voltage threshold, taking the sum of the initial duty ratio and the regulating duty ratio as the third target duty ratio of the third switch module, and taking the difference between the initial duty ratio and the regulating duty ratio as the fourth target duty ratio of the fourth switch module.

12. The method as claimed in claim 9, wherein in response to the inductor being connected with the third common terminal and the power supply output terminal respectively, regulating the initial duty ratio of the third switch module or the fourth switch module according to the regulating duty ratio, comprises at least one of, in response to a determination that the capacitor voltage is less than or equal to the first voltage threshold, taking a difference between the initial duty ratio and the regulating duty ratio as a third target duty ratio of the third switch module, and taking a sum of the initial duty ratio and the regulating duty ratio as a fourth target duty ratio of the fourth switch module; or in response to a determination that the capacitor voltage is greater than the first voltage threshold, taking the sum of the initial duty ratio and the regulating duty ratio as the third target duty ratio of the third switch module, and taking the difference between the initial duty ratio and the regulating duty ratio as the fourth target duty ratio of the fourth switch module.

13. A power supply device, comprising the circuit for voltage conversion as claimed in claim 1.

14. A non-transitory computer-readable storage medium storing a computer program which, when executed by a processor, causes the processor to carry out the method as claimed in claim 6.

15. The circuit as claimed in claim 3, wherein the driving module comprises, a pulse generating unit that comprises a turn-on-pulse output terminal and a turn-off-pulse output terminal;

a first transformer that comprises a first primary winding and a plurality of first secondary windings, with both ends of the first primary winding connected in parallel with a first diode; wherein an anode of the first diode is connected with a non-dotted end of the first primary winding, a non-dotted end of each first secondary winding is correspondingly connected with a gate electrode of the first switching device through a second diode and a first resistor in sequence; and a dotted end of each first secondary winding is correspondingly connected with a source electrode of the first switching device;

a second switching device that comprises, a gate electrode connected with the turn-on-pulse output terminal, a drain electrode connected with the anode of the first diode, and a source electrode connected with the ground lead;

a second transformer that comprises a second primary winding and a plurality of second secondary windings, with both ends of the second primary winding connected in parallel with a third diode; wherein an anode of the third diode is connected with the non-dotted end of the second primary winding; the dotted end of each second secondary winding is correspondingly connected with the first switching device through a third switching device and a fourth switching device;

the dotted end of each second secondary winding is connected with the gate electrode of the third switching device; the drain electrode of the third switching device is connected with a base electrode of the fourth switching device;

the source electrode of the third switching device is connected with the source electrode of the first switching device; a emitting electrode of the fourth switching device is connected with the gate electrode of the first switching device; and a collecting electrode of the fourth switching device is connected with the source electrode of the first switching device; and a fifth switching device that comprises, a gate electrode connected with the turn-off-pulse output terminal, a drain electrode connected with the anode of the third diode, and a source electrode connected with the ground lead.

16. A power supply device comprising a memory, a processor and a computer program stored in the memory and executable by the processor which, when executed by the processor causes the processor to carry out the method of claim 6.

\* \* \* \* \*